(12) United States Patent
Ashelin et al.

(10) Patent No.: US 6,272,799 B1
(45) Date of Patent: Aug. 14, 2001

(54) LOADING DOCK SEAL WITH ADJUSTABLE MOUNTING BRACKET

(75) Inventors: Charles J. Ashelin; Jason D. Miller, both of Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/337,702

(22) Filed: Jun. 21, 1999

(51) Int. Cl.[7] .................................................. E04H 14/00
(52) U.S. Cl. ...................... 52/173.2; 52/2.12; 52/718.05; 52/745.15
(58) Field of Search ................................ 52/2.12, 173.2, 52/718.05, 745.15

(56) References Cited

U.S. PATENT DOCUMENTS

| | | |
|---|---|---|
| 2,704,574 | 3/1955 | Etlar . |
| 3,375,625 | 4/1968 | Edkins et al. . |
| 3,665,997 | 5/1972 | Smith et al. . |
| 3,935,684 * | 2/1976 | Frommelt et al. ................... 52/173.2 |
| 4,213,279 | 7/1980 | Layne . |
| 4,238,910 * | 12/1980 | O'Neal ............................ 52/173.2 X |
| 4,262,458 | 4/1981 | O'Neal . |
| 4,322,923 | 4/1982 | O'Neal . |
| 4,601,142 | 7/1986 | Frommelt . |
| 4,724,648 | 2/1988 | Diepholder . |
| 4,799,341 | 1/1989 | Frommelt et al. . |
| 4,799,342 | 1/1989 | Klevnjans . |
| 4,825,607 | 5/1989 | Frommelt et al. . |
| 5,174,084 | 12/1992 | Alten . |
| 5,608,996 | 3/1997 | Brockman et al. . |

OTHER PUBLICATIONS

*International Search Report* corresponding to International Application Serial No. PCT/US00/13364, dated Aug. 24, 2000, 7 pages.

* cited by examiner

*Primary Examiner*—Christopher T. Kent
(74) *Attorney, Agent, or Firm*—Marshall, O'Toole, Gerstein, Murray & Borun

(57) ABSTRACT

A loading dock seal includes a low-profile backer that is vertically adjustable relative to a wall-mounted bracket to facilitate the installation of the seal. In some embodiments the bracket is generally U-shaped with a turned-in lip on one leg of the U-shape. The backer, to which a compressible foam pad is attached, is similarly U-shaped to nest within the bracket. During installation of the seal, the turned-in lip restrains the backer horizontally, yet allows the backer to be adjusted vertically to properly position the seal. Once properly adjusted, an added fastener further fixes the backer to the bracket, so that the seal is fixed both horizontally and vertically. In some embodiments, the low profile of the backer is achieved by forming the both the backer and the bracket out of sheet metal. The backer includes elongated channels or slots for bolt head clearance to accommodate anchor bolts that connect the bracket to a wall.

23 Claims, 3 Drawing Sheets

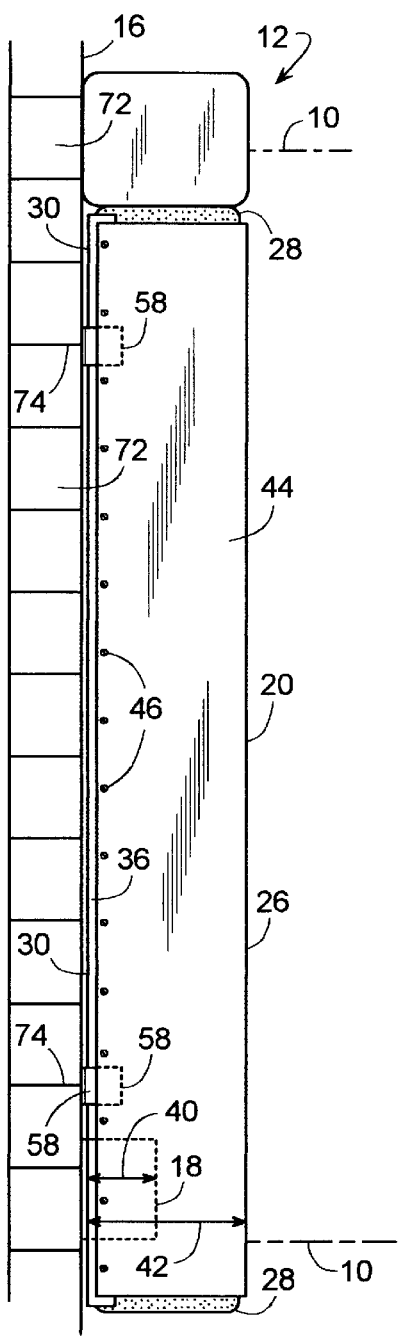
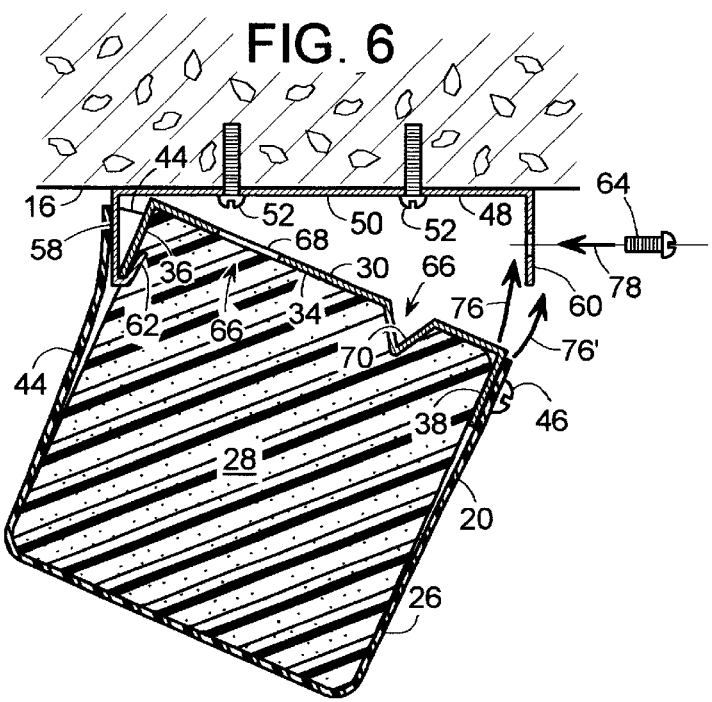
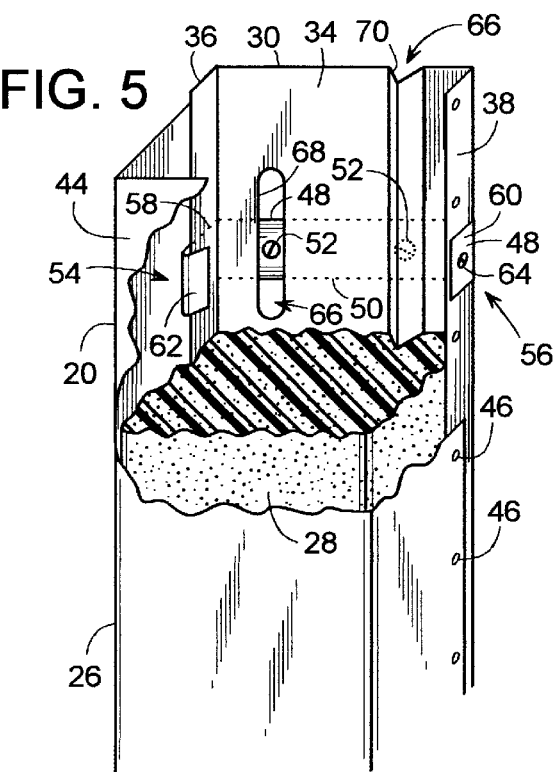

LOADING DOCK SEAL WITH ADJUSTABLE MOUNTING BRACKET

BACKGROUND OF THE INVENTION

1. Field of the Invention

The subject invention generally pertains to loading dock seals and more specifically to a bracket for mounting them.

2. Description of Related Art

Trucks and other vehicles typically back up against a loading dock or doorway of a building to load or unload the vehicle's freight. A dock seal or shelter usually installed along the periphery of the doorway is often used to seal an air gap that might otherwise exist between the outer wall of the building and the back of the vehicle. If left unsealed, the gap might allow the outside weather to increase the building's heating or cooling load, allow rain and snow to enter the interior of the building or simply subject the inside dock workers to an uncomfortable draft while they service the vehicle.

A conventional sealing member often includes an elongated foam pad bonded to an equally long wood backer. To mount the seals along two vertical side edges of the doorway, several L-shaped brackets connect the edges of the backer to the wall that is adjacent the doorway. As a vehicle backs up against the sealing member, the compressibility and resilience of the foam enables the seal to conform to the contour of the rear vertical edges of the truck. A flexible, wear-resistant cover wrapped over the pad and attached to the edges of the wood backer protects the foam not only from wear, but also helps keep dirt and moisture from entering the pores of the foam. Usually another sealing member lies generally horizontally across the top of the doorway to seal against a rear upper edge of the vehicle.

Upon backing against the dock, the rear of the vehicle typically stops at a nominal set distance from the face of the dock, as usually determined by bumpers that are attached to the wall and positioned to engage the rear of the vehicle. With the back of the vehicle against the bumpers, a compressible foam seal will generally be at its predetermined minimum compressed thickness. If the predetermined minimum thickness is too small relative to its normally relaxed thickness, the seal may be subjected to excessive compressive forces that could damage the seal or at least shorten its life. The compressive forces can be reduced by reducing the normally relaxed thickness of the foam. Such an approach, however, diminishes the sealing effectiveness of the seal, because for a given foam material, generally the thicker it is, the better is its ability to conform to the shape of the vehicle, and thus the better it can seal. Consequently, even the thickness of the wood backer to which the foam pad is mounted can significantly effect the useful life of the seal and/or the seal's ability to seal.

Conventional foam seals with wood backers can be awkward to install or replace due to the bulk of the foam combined with the weight of the wood backer. It usually takes one installer to hold the seal in position, while a second installer anchors it to the wall. For a block wall, the anchors are preferably installed in the mortar between two rows of cement blocks, as a cement block's hollow center reduces the holding force of the anchor. Thus, with the anchors fixed at discrete vertical locations, some vertical adjustment of the seal relative to the brackets may be necessary to place the seal at the proper elevation. Since loading dock seals are mounted relatively high, two installers on two ladders adjusting and mounting an awkward dock seal can be unsafe when it is not done properly.

SUMMARY OF THE INVENTION

In order to provide a dock seal that is readily installed with a backer of minimum thickness, a dock seal is provided with a relatively thin backer that engages a first portion of a wall-mounted bracket that restricts the seal horizontally but allows some vertical adjustment of the seal relative to the bracket. Once the vertical position of the seal is properly adjusted, the backer is fixed to a second portion of the bracket to hold the dock seal in position.

In some embodiments, a generally U-shaped bracket includes a turned-in lip that restrains a dock seal backer horizontally, yet allows some vertical adjustment of the backer.

In some embodiments, a backer formed of a unitary piece of sheet metal supports a foam pad of a dock seal and holds a protective cover over the foam pad.

In some embodiments, a backer includes an elongated channel to provide clearance for a fastener that anchors a bracket to the wall of a loading dock.

In some embodiments, a foam dock seal includes a protective cover that at least partially covers a foam core, a backer adjacent the foam, and a bracket that mounts the backer to the wall of a loading dock.

BRIEF DESCRIPTION OF THE DRAWINGS

FIG. 2 is a left-side view of FIG. 1.

FIG. 5 is a perspective cut-away view of a loading dock seal.

FIG. 6 is an assembly view of a seal backer being attached to a mounting bracket.

DESCRIPTION OF THE PREFERRED EMBODIMENT

Figure 1:
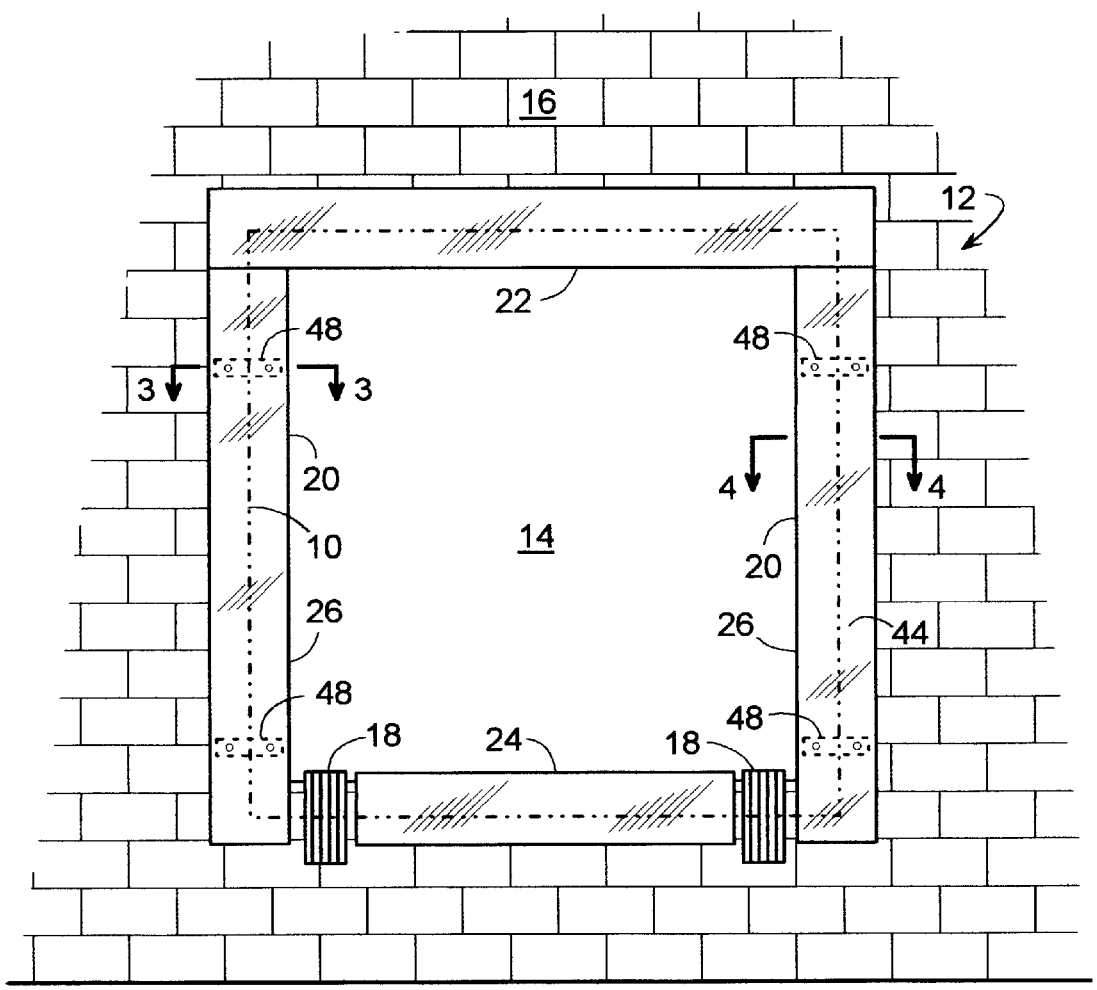
FIG. 1 is a front view of a loading dock incorporating at least one embodiment of a loading dock seal.

FIGS. 1 and 2 show the general outline of a vehicle 10, such as a truck and/or trailer, which has backed into a loading dock 12. Loading dock 12 is basically a doorway 14 or an opening in a wall 16 of a building and is often associated with a variety of peripheral items to facilitate loading and unloading of the vehicle's cargo.

For example, when vehicle 10 is backed up against bumpers 18 at dock 12, dock seals 20 and 22 help seal the air gap that may otherwise exist between the outer face of wall 16 and the upper and lateral edges of the rear of vehicle 10. Much of the gap between the edges of doorway 14 and a lower rear edge of vehicle 10 can be blocked off by a conventional dock leveler 24, which usually has a retractable lip that can extend outward to bridge that gap. However, the gap at the upper and lateral edges of vehicle 10 typically requires additional sealing, and the shape of the gap in these areas can be quite unpredictable.

Figure 3:
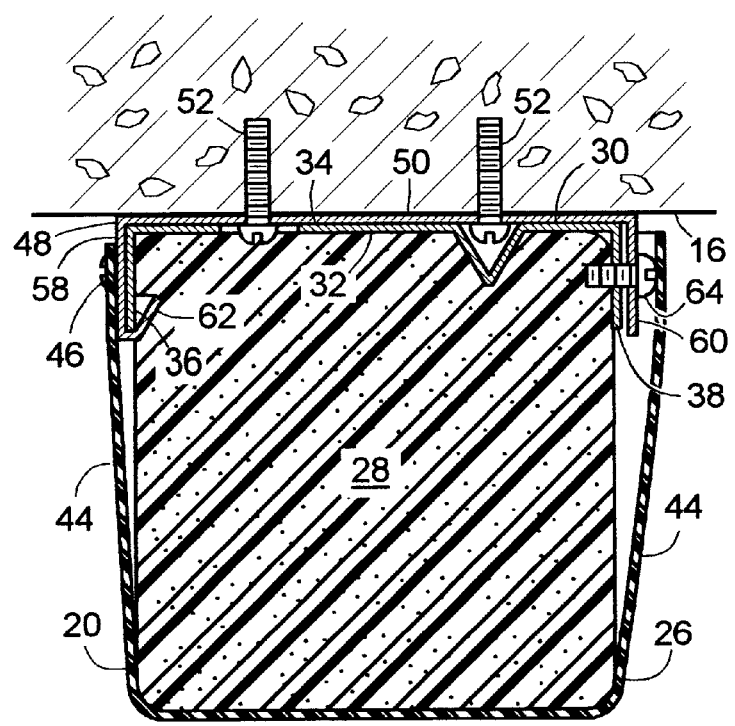
FIG. 3 is a cross-sectional top view taken along line 3—3 of FIG. 1.
Figure 4:
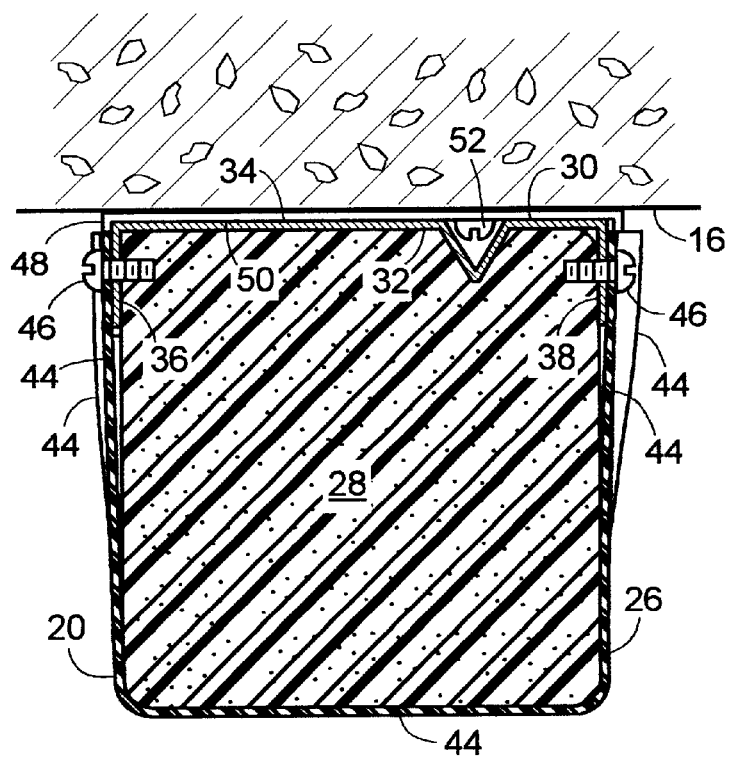
FIG. 4 is a cross-sectional top view taken along line 4—4 of FIG. 1.

To fill the irregular gap that may exist along the lateral edges of doorway 14, each dock seal 20 includes an elongated seal member 26 that is resiliently compressible. Such a characteristic can be provided by a variety of different structures. However, referring further to FIGS. 3–5, in some embodiments the resilient compressibility is provided by a foam pad 28 made of a foamed polyurethane or foamed polyester, such as, for example, an L2ooo open-cell polyurethane foam provided by Leggett & Platt of Carthage, Mo. It should be appreciated by those skilled in the art, however, that a wide variety of other synthetic or natural foams may also work well. Moreover, mechanical springs or bellows may also accomplish the desired functions otherwise provided by foam.

To provide seal member 26 with some structural support, foam pad 28 is situated adjacent a relatively rigid backer 30. In some embodiments, an adhesive 32 directly attaches pad 28 to a web portion 34 of backer 30. Two flanges 36 and 38 extending from web 34 add rigidity to backer 30. This allows web 34 to be relatively thin to maximize the nominal compressed thickness 40 of pad 28 when fully compressed by vehicle 10 being tight up against bumpers 18. Maximizing the fully compressed thickness of pad 28 (as a percentage of its normally decompressed thickness 42) reduces the maximum compressive forces on the seal. Reducing the compressive forces reduces seal wear and prolongs the life of the seal. For simplicity and to minimize costs, in some embodiments, backer 30 is a unitary piece of sheet metal that is readily formed using a conventional press or roll-forming process. Backer 30 could also be extruded from plastic, aluminum, or other readily extruded materials.

Flanges 36 and 38 also provide a convenient location for attaching a flexible, water-resistant, wear-resistant cover 44 that protects foam pad 28. Such a cover can be important, as many foam materials tend to absorb moisture, hold dirt, and/or have relatively poor wear resistance. Cover 44 can be held in place by self-tapping screws 46 that screw into flanges 36 and 38, or could by any one of a variety of other fasteners. Some examples include, but are not limited to, other types of screws, VELCRO, rivets, hooks, and adhesive. In some embodiments, cover 44 is a 3022_MFRLPC_ DC7 material provided by the Seaman Corporation of Wooster, Ohio. Other examples of cover materials would include, but are not limited to, HYPALON, canvas duck, rubber impregnated fabric and coated nylon fabric. Although, FIG. 2 shows upper and lower end portions of foam pad 28 uncovered (for illustrative purposes), in some embodiments pad 28 is actually covered more completely.

To allow some vertical adjustment of seal member 26 during its installation, a unique mounting bracket 48 is used. Bracket 48 includes a crosspiece 50 adapted to be mounted to wall 16 by way of an appropriate anchor 52. Depending on the construction of wall 16, an appropriate anchor 52 may be a conventional concrete anchor, nut and bolt, screw, or some other type of fastener. Bracket 48 also includes two points of attachment 54 and 56 to which backer 30 can be connected. In some embodiments, bracket 48 is generally U-shaped with points of attachment 54 and 56 being provided by two tabs 58 and 60 that extend from crosspiece 50. Tab 58 includes a turned-in lip 62 that engages flange 36 to limit the horizontal movement of backer 30 while allowing some vertical adjustment during installation. Once properly adjusted, tab 60 and flange 38 are connected by some type of fastener 64, such as a self-tapping screw, to fix seal member 26 relative to wall 16. In a currently preferred embodiment, crosspiece 50, tabs 58 and 60, and lip 62 comprise a unitary piece formed of sheet metal.

In some cases, to maximize the nominal compressed thickness of foam pad 28, the head of anchor bolt 52 is accommodated by providing backer 30 with an anchor clearance 66. Anchor clearance 66 can be a slot 68 in backer 30 or an elongated channel 70 having any of a variety of shapes including, but not limited to, triangular, rectangular or semi-cylindrical. Both slot 68 and channel 70 are illustrated in a single backer; however, typically only one or the other would be used on any particular backer. Having clearance 66 elongated, regardless of whether it's a slot or a channel, allows some vertical positioning adjustment between backer 30 and bracket 48. Vertical positioning adjustment is especially important when seal member 26 is to be attached to a block wall, as opposed to a poured one.

To attach seal 26 on wall 16, which in this example is comprised of conventional concrete blocks 72 set in horizontal rows of standard eight-inch centers, two brackets 48 are first attached to the wall. For positive holding, anchors 52 are inserted into solid mortar 74 between the blocks, rather than into a block 72 that may be hollow. Thus, the positioning of brackets 48 will be in discrete vertical increments of eight-inches. In order to provide infinite vertical adjustment of seal member 26 within the eight-inch increments of brackets 48, anchor clearance 66 of backer 30 has a length of at least eight-inches.

Then, to attach seal member 26 to bracket 48, flange 36 of backer 30 is inserted under lip 62 of bracket 48, as shown in FIG. 6. Cover 44 being somewhat stretched over tab 58 tends to draw flange 36 under lip 62 and helps hold it there. Flange 36 being under lip 62 mechanically restrains the edge of flange 36 in substantially all horizontal directions (i.e., horizontal movement is limited to within assembly clearance, provided backer 30 is not pivoted back out from under lip 62). At this point, the position of seal member 26 can then be adjusted vertically as needed.

When seal 26 is in its proper position, e.g., up against the underside of top seal 22, seal 26 is further fixed vertically. In one embodiment, this is accomplished by pivoting backer 30 up against bracket 30 with tab 60 being tucked between flange 38 and cover 44, as indicated by arrows 76 and 76'. Depending on the relative widths of backer 30 and bracket 48, they may need to flex some to allow backer 30 to swing or snap into bracket 48. With backer 34 nested within bracket 30, a bolt hole is drilled through flange 38 and tab 60, and the two are fastened with a screw 64 (e.g., a self-tapping screw or some other type of fastener), as depicted by arrow 78. In some embodiments, the bolt hole in tab 60 is predrilled prior to attaching bracket 48 to wall 16. Then only the hole in flange 38 needs to be drilled at the installation site, and the drilling of flange 38 can be guided by the hole already existing in tab 60 of bracket 48. For aesthetics or protection against weather, cover 44 can be extended to at least partially cover backer 30, bracket 48 and screws 64.

Although the invention is described with reference to a preferred embodiment, it should be appreciated by those of ordinary skill in the art that various modifications are well within the scope of the invention. For example, although various embodiments have been described with reference to a vertical side seal, the invention is readily applied to a horizontal top seal as well. Therefore, the scope of the invention is to be determined by reference to the claims that follow.

What is claimed is:

1. A loading dock seal adapted to be attached to a wall of a loading dock and seal against a vehicle, comprising:
   a seal member adapted to seal against the vehicle;
   a bracket attachable to the wall;
   a backer disposed adjacent the seal member;
   a first point of attachment disposed on the bracket and attachable to the backer to limit movement of the backer relative to the bracket in a first direction but to allow movement of the backer relative to the bracket in a second direction substantially perpendicular to the first direction; and a second point of attachment disposed on the bracket and attachable to the backer to limit movement of the backer relative to the bracket in the second direction, whereby the first point of attachment facilitates a positioning adjustment of the backer in the second direction after the bracket is attached to the wall, while the second point of attachment together with the first point of attachment is adapted to substantially fix the backer relative to the bracket once the positioning adjustment is complete.

2. The loading dock seal of claim 1, wherein the first direction lies in a substantially horizontal plane and the second direction is substantially vertical.

3. The loading dock seal of claim 1, wherein the bracket is adapted to be disposed between the wall and the backer.

4. The loading dock seal of claim 1, wherein the first point of attachment is a first tab extending from the bracket, and the second point of attachment is a second tab extending from the bracket.

5. The loading dock seal of claim 4, wherein the bracket includes a crosspiece integrally interposed between the first tab and the second tab to render the bracket as a unitary piece.

6. The loading dock seal of claim 5, wherein the backer is disposed against the crosspiece and interposed between the first tab and the second tab when the backer is attached to the bracket.

7. The loading dock seal of claim 3, wherein the first tab includes a turned-in lip adapted to engage the backer to limit an extent to which the backer can move away from the wall, yet allow the backer to move in the second direction.

8. The loading dock seal of claim 1, wherein the backer defines an anchor clearance for an anchor adapted to fasten the bracket to the wall.

9. The loading dock seal of claim 8, wherein the anchor clearance is defined by an elongated channel running along a length of the backer.

10. The loading dock seal of claim 8, wherein the anchor clearance is defined by an elongated slot extending along a length of the backer.

11. The loading dock seal of claim 1, wherein the first point of attachment allows the backer to move relative to the bracket at least eight inches in the second direction to facilitate the positioning adjustment of the backer.

12. The loading dock seal of claim 1, further comprising an adhesive interposed between the seal member and the backer.

13. The loading dock seal of claim 1, wherein the seal member includes a flexible protective cover disposed over a foam pad.

14. The loading dock seal of claim 13, wherein the flexible protective cover is further disposed over the backer.

15. The loading dock seal of claim 14, wherein the flexible protective cover is further disposed over the bracket.

16. A loading dock seal adapted to be attached to a wall of a loading dock and seal against a vehicle, comprising:
   a backer that includes a web interposed between a first flange and a second flange;
   a foam pad adjacent the web;
   a flexible protective cover disposed over the foam pad, attached to the first flange and the second flange, and adapted to seal against the vehicle;
   a bracket adapted to be interposed between the wall and the backer;
   a first tab disposed on the bracket and attachable to the first flange to limit movement of the backer relative to the bracket in a first direction but to allow movement of the backer relative to the bracket in a second direction; and
   a second tab disposed on the bracket and attachable to the second flange to limit movement of the backer relative to the bracket in the second direction, whereby the first tab facilitates a positioning adjustment of the backer in the second direction, while the second tab together with the first tab is adapted to substantially fix the backer relative to the bracket.

17. The loading dock seal of claim 16, wherein the first tab includes a turned-in lip adapted to engage the first flange to limit an extent to which the backer can move away from the wall, yet allow the backer to move in the second direction.

18. The loading dock seal of claim 16, wherein the flexible protective cover is further disposed over the first tab, the second tab, the first flange and the second flange.

19. The loading dock seal of claiml 6, wherein the web defines an anchor clearance for an anchor adapted to fasten the bracket to the wall.

20. The loading dock seal of claim 19, wherein the anchor clearance is defined by an elongated channel running along a length of the backer.

21. The loading dock seal of claim 19, wherein the anchor clearance is defined by an elongated slot extending along a length of the backer.

22. A method of installing a loading dock seal to a wall of a loading dock, comprising:
   mechanically restraining an edge of the loading dock seal in substantially all horizontal directions; and
   vertically adjusting a position of the loading dock seal while restraining the edge horizontally.

23. The method of claim 22 further comprising attaching a bracket to the wall, wherein the step of mechanically restraining the edge is facilitated by the bracket.

* * * * *